Nov. 17, 1959 J. LEEDER 2,913,181

ELECTRONIC SCALING APPARATUS IN ANALOG COMPUTERS

Filed Feb. 9, 1956 3 Sheets-Sheet 1

INVENTOR.
JACOB LEEDER
BY Wade Koontz
Martin J. Finnegan
ATTORNEYS

INVENTOR.
JACOB LEEDER
BY Wade Koontz and Martin J. Finnegan
ATTORNEYS

Nov. 17, 1959 J. LEEDER 2,913,181

ELECTRONIC SCALING APPARATUS IN ANALOG COMPUTERS

Filed Feb. 9, 1956 3 Sheets-Sheet 3

INVENTOR.
JACOB LEEDER

BY Wade Koontz
Martin J. Finnegan
ATTORNEYS

United States Patent Office 2,913,181

Patented Nov. 17, 1959

2,913,181

ELECTRONIC SCALING APPARATUS IN ANALOG COMPUTERS

Jacob Leeder, Aberdeen, Md., assignor to the United States of America as represented by the Secretary of the Air Force Application February 9, 1956, Serial No. 564,589

7 Claims. (Cl. 235—194)

(Granted under Title 35, U.S. Code (1952), sec. 266)

The invention described herein may be manufactured and used by or for the United States Government for governmental purposes without payment to me of any royalty thereon.

This invention relates to scaling, and more particularly to improved methods and apparatus for automatic scaling.

The accuracy of some types of electronic computing mechanisms; for example, analogue multipliers, have been quoted in terms of full scale (full scale being customarily 100 volts). If then an analogue multiplier unit is specified as having a 1% accuracy, then the output is considered to be accurate to within plus or minus one volt. The proportionality factor of some types of analogue multipliers is generally taken to be 1/100 so that the multiplier output voltage is 1/100 that of the product of the two input voltages. The possible error of one volt can be overwhelming when multiplying small voltages.

By the use of a scaling method and apparatus, the error in the final results of some types of electronic computing mechanisms can be drastically reduced. For example, let X and Y designate the voltage whose product is desired. If, now, X is less in magnitude than an arbitrarily assigned voltage $V_x$, let X be multiplied by the constant factor M before being led to the multiplier input, and likewise in the case of Y, if Y is less in absolute magnitude than the voltage $Y_y$, let Y be multiplied by the factor N being being led to the other multiplier input. The output from the multiplication unit is then $$Vom = .01MNXY \pm \text{one volt}$$

the plus or minus one volt being the assumed possible error of the multiplier. If this output is divided by the factor MN, the output from the whole system is $$Vo = .01XY \pm \frac{1}{MN} \text{ volts}$$

giving the desired product but with a possible error of $$\pm \frac{1}{MN} \text{ volts}$$

Since MN can be made very large, the error can be made exceedingly small, thus permitting the computation of small numbers with a good degree of accuracy.

The present invention utilizes the concept of scaling the voltages to be computed in such a fashion that the computing unit will function near maximum accuracy over the maximum range of input voltages. As one method of achieving such a result, small input voltages are multiplied by a constant much greater than one before being fed to the computing unit and the resulting computation is divided by the same constant factor to remove the effect of the factor from the final value.

The invention also embraces the utilization of means to carry out operations of multiplication and division automatically in accordance with the magnitude of the input voltages being computed.

For a more complete understanding of the invention, reference should now be made to the drawing in which.

Figure 1:
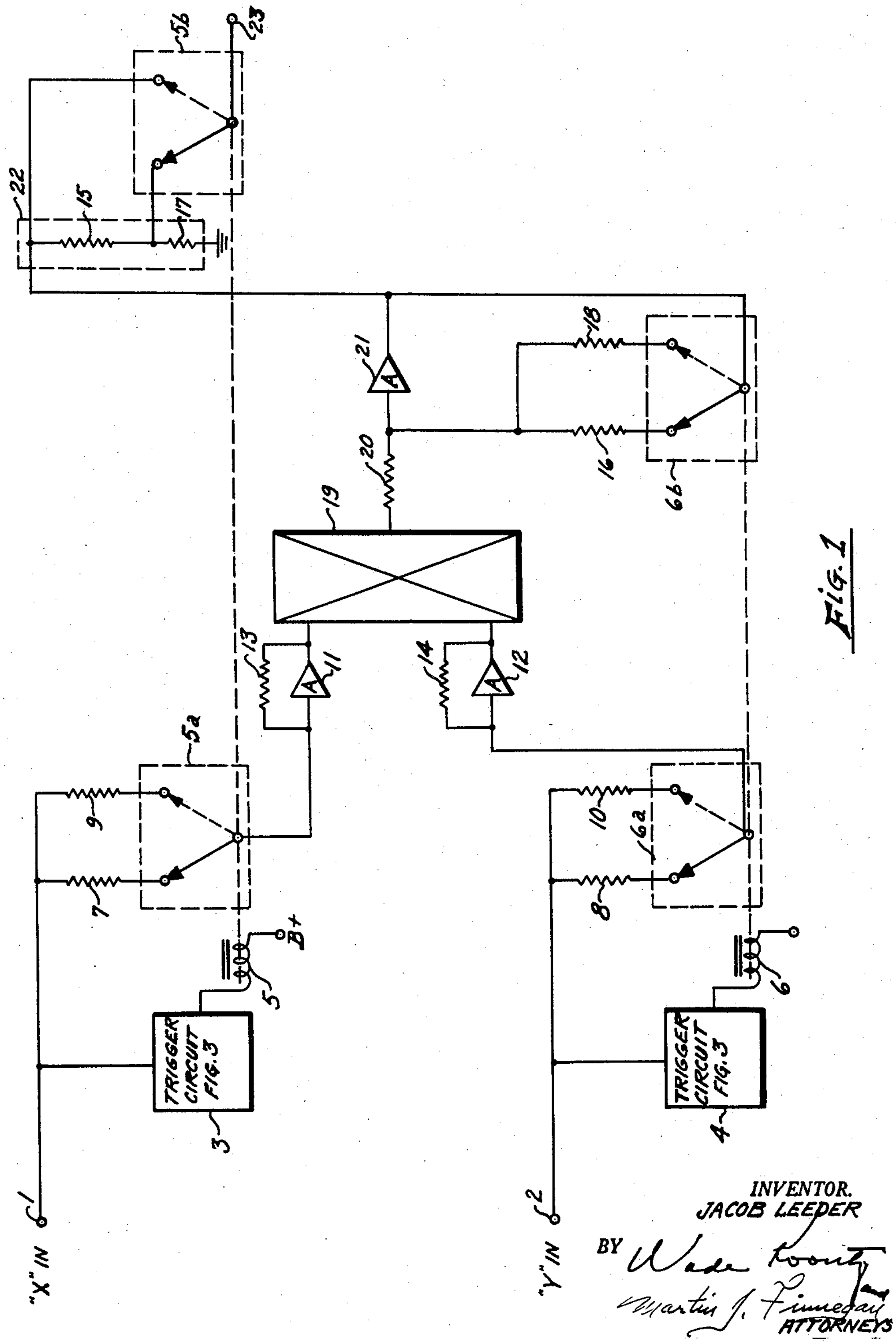
Fig. 1 is a diagram of a dual range automatic relay scaler with a computer component (i.e. multiplier) illustrating an embodiment of the invention wherein increased accuracy for computation may be obtained.

Referring now to Fig. 1, the invention, while not limited thereto, is particularly applicable to and has been shown as embodied in this apparatus. As shown diagrammatically in Fig. 1, the circuit consists of X and Y input channels. Terminals 1 and 2 are adapted to receive the signal input voltages for the X and Y channels, respectively. Each channel is independent of the other but identical to each other. Therefore, the circuitry of one representative channel as X need be considered.

In the X channel, from input terminal 1, the signal input voltage X is fed simultaneously to trigger circuit 3, and to the input precision resistances 7 and 9 of the high gain amplifier 11. Input precision resistor, 7 or 9, is selected for the said high-gain amplifier 11 by trigger circuit 3 and its associated relay consisting of relay coil 5 and the first pole 5a of double pole-double throw switch 5a, 5b. High-gain amplifier 11 is provided with precision feedback resistor 13. A computing element as analogue multiplier 19 is adapted to receive the output of the said high-gain amplifier 11. The said computing element in this instance is analogue multiplier 19. High-gain amplifier 21 is provided with input precision resistor 20. The said high-gain amplifier 21 utilizes either feedback precision resistor 16 or 18. One of the said feedback precision resistors 16 or 18 is selected by trigger circuit 4 and its associated relay consisting of relay coil 6 and the second pole 6b of double pole-double throw switch 6a, 6b. Voltage dividing network 22 is comprised of precision resistors 15 and 17. The output of the said voltage dividing network 22 is selected by trigger circuit 3 and its associated relay consisting of relay coil 5 and the second pole 5b of double pole-double throw switch 5a, 5b.

Figure 2:
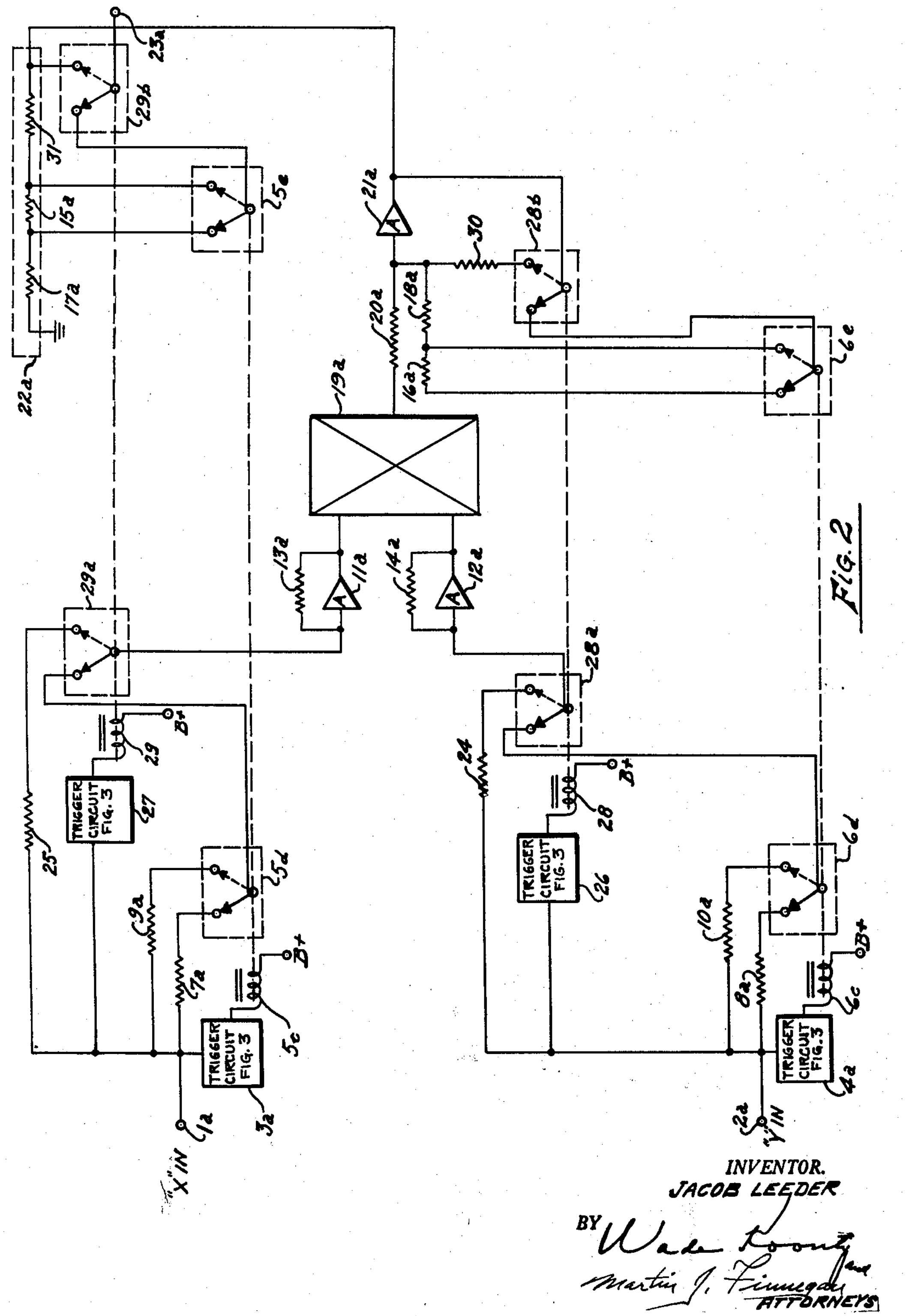
Fig. 2 is a diagram of a triple range automatic relay scaler with a computer component (i.e. multiplier) illustrating an extension of the invention wherein increased accuracy for computation may be obtained.

Fig. 2 represents an extension of the invention as shown in Fig. 1. The said extension is achieved by the addition to the components of Fig. 1 the following: input precision resistor 25 and its associated selector circuit comprising trigger circuit 27, relay coil 29 and the first pole 29a of double pole-double throw switch 29a, 29b; input precision resistor 24 and its associated selector circuit comprising trigger circuit 26, relay coil 28 and the first pole 28a of double pole-double throw switch 28a, 28b; feedback precision resistor 30 and its associated selector switch 28b; and voltage dividing network precision resistor 31 and its associated selector switch 29b.

Figure 3:
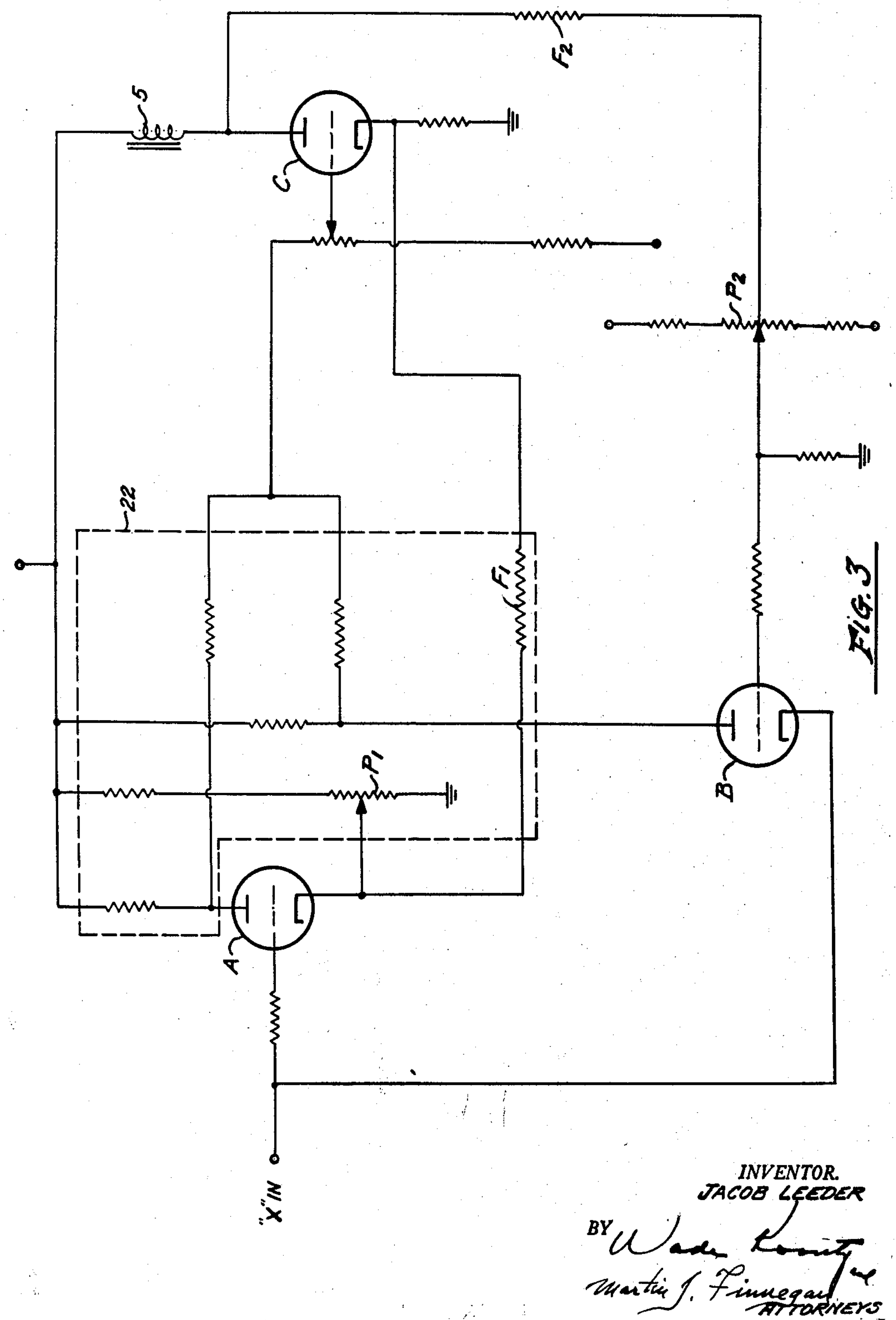
Fig. 3 is a schematic diagram of a trigger circuit for actuation of a relay in accordance with the magnitude of input voltages.

Fig. 3 is representative of each of the trigger circuits. As shown in Fig. 3, each trigger circuit consists of three amplifier units A, B, and C, of which units A and B receive components of the input signal energy (X or Y, as the case may be) while unit C is in a series circuit with the relay coil 5 from which series circuit there is a feedback of energy to units A and B. The value of the positive input voltage, X+, at which relay coil 5 is to be energized is determined by the setting of potentiometer $P_1$ in the cathode circuit of unit A, while the negative voltage, X−, at which energization takes place is determined by potentiometer $P_2$ in the grid circuit of unit B. Thus, if the input voltage is within the range of X+ to X− volts, relay coil 5 will be in a certain state designated as state 1, (i.e. full current through the relay coil 5), while if the input voltage falls outside this range, the relay coil 5 will be in the second state (low or minimum current through relay coil 5).

The "flip-flop" or triggering action of the circuit is due to feedback resistors, $F_1$ and $F_2$. Actually each of the so-called critical operating points X+ and X− are small regions about 0.1 volt in extent and not strictly points. Thus, considering the region about X+, the circuit will "flip" from state 1 to state 2 when the input voltage is raised to a certain point near X+ and will trigger in the reverse direction, from state 2 to state 1, when the input voltage drops to a slightly lower level. The difference between the two levels is determined by the value of feedback resistor $F_1$ for the positive input voltage, and feedback resistor $F_2$ for the negative input voltage and is necessary with the particular relay used to insure unambiguous operation.

The automatic relay scaler carries out multiplication and division in accordance with the magnitude of the input voltages. The aforesaid device consists essentially of high speed double pole-double throw relays which are actuated by their associated trigger circuits, the said trigger circuits being responsive to the magnitude of the signal input voltages.

Double pole-double throw switch *5a, 5b* is representative of each of the double pole-double throw switches. There are two positions for the said double pole-double throw switch *5a, 5b*. The first position is represented by the solid line, as shown in the first pole *5a*, and will be referred to as state 1. The second position is represented by a dotted line, as shown in the first pole *5a*, and will be referred to as state 2. Multiplication of the signal input voltage, X, is performed in the following manner; when the said double pole-double throw switch *5a, 5b* is in state 1, the first pole *5a* places the precision resistor 7 in the input to the high-gain amplifier 11 which has a fixed feedback precision resistor 13 and, therefore, the output of the said high-gain amplifier 11 to the analogue multiplier 19 is:

$$Vo=\frac{\text{resistor 13}}{\text{resistor 7}}\times(\text{input voltage})=M_1\cdot X$$

This, in essence, is a multiplication of the said input voltage X by a factor $M_1$. At the same time, the second pole *5b* of the said double pole-double throw switch *5a, 5b* is used to divide the output from the said analogue multiplier 19 by the same factor $M_1$ thus removing the effect of the factor $M_1$ from the final product. There are a number of methods and means that may be employed in the division process, and in the particular instance shown division by the factor $M_1$ using the second pole *5b* of the said double pole-double throw switch *5a, 5b* is carried out in the simple voltage dividing network comprising precision resistors 15 and 17. If the said double pole-double throw switch *5a, 5b* is in state 2, then precision resistor 9 is placed in the input to the said high-gain amplifier 11 and the output voltage is then:

$$Vo=\frac{\text{resistor 13}}{\text{resistor 9}}\times(\text{input voltage})=M_2\cdot X$$

while at the same time the output voltage from the said analogue multiplier 19 is divided by the same factor $M_2$. The division is accomplished in this instance by usng the second pole *5b* of the said double pole-double throw relay switch *5a, 5b*. The said switch, *5b*, is triggered into state 2 and a simple voltage dividing network provides a division factor of the said $M_2$.

Likewise, for the case of the input voltage Y, in state 1 the first pole *6a* of double pole-double throw switch *6a, 6b* is used with input resistor 8 to the high gain amplifier 12 to multiply by a given factor $N_1$, and simultaneously the output from the said analogue multiplier 19 is divided by the same factor $N_1$ by the second pole *6b* of the said double pole-double throw switch *6a, 6b* used in conjunction with high-gain amplifier 21 and its associated input precision resistor 20 and feedabck precision resistor 16. The same principle is used for factor $N_2$ when double-pole, double-throw switch *6a, 6b* is in state II.

In the illustration, resistances have so been chosen that $M_1, N_1=25$ and $M_2, N_2=1$.

The division process illustrated was selected for ease in presentation and may not necessarily be the best. In place of the voltage dividing network 22 for double pole-double throw switch *5a, 5b*, the input precision resistor 20 to high-gain amplifier 21 could have been varied by triggering the said double-double throw switch *5a, 5b*. If the use of an amplifier for one of the division processes were undesirable for economy of components, a second voltage dividing network could be employed.

The essential features of the system are the independence of X and Y channels, and in any channel, multiplication of the input voltage by any given factor is compensated for by the simultaneous division of the product by the same factor as a consequence of the action of the high speed double pole-double throw relay.

In the triple range scaler, as shown in Fig. 2 quoting typical values for ease in presentation, if the numerical value of the input voltage X (and likewise for the Y channel) lies between 0 and about 4 volts, the input voltage, X, is multiplied by the factor 25 before being led to the said analogue multiplier 19a, while if the numerical value of input voltage, X, lies between about 4 and 20 volts, the multiplication factor is taken as 5; and between 20 and 100 volts for the said input voltage, X, the multiplication factor is unity. In every case, the multiplication factors are so chosen that the input voltage to the said analogue multiplier 19a will not exceed 100 volts.

For each additional range in the division of the input voltage, X, an additional basic trigger circuit as trigger circuit 27 and associated relay composed of relay coil 29 and double pole-double throw switch *29a, 29b* is required. Hence, in case of division of the said input voltage, X, into three ranges, two trigger circuits *3a*, 27 and two of their associated relays are required per channel. In any channel, the inputs to the trigger circuits are in parallel, and the relay coil contacts are wired as indicated in Fig. 2. It will be noted that the arrangement constitutes, essentially, a three position switch.

Considering the X channel in Fig. 2, the trigger circuits are made to actuate double-pole, double-throw switch *5d, 5e* when the input voltage, X, exceeds about four volts in magnitude, while double-pole, double-throw switch *29a, 29b* is actuated when the input voltage, X, exceeds about 19 volts in magnitude. In principle, then, the entire input voltage range can be divided into as many segments with associated multiplication factors as is desired. The trigger circuits are arranged for parallel operation, and the relays are cascaded to form a multi-position switch.

What is claimed is:

1. An electronic computing mechanism comprising a plurality of input terminals adapted to receive input voltages which are representative of numerical quantities, first multiplier means for multiplying said input voltages by given constants, second multiplier means adapted to receive the products of said first multiplying means and means for dividing the output voltage of said second multiplier means by said given constants, said first multiplying means including amplifiers for the voltages representative of said numerical quantities, and associated control means for selectively varying the gain of said amplifiers in accordance with the magnitudes of the said input voltages.

2. An electronic computing mechanism comprising a plurality of input terminals adapted to receive input voltages which are representative of numerical quantities, first multiplier means for multiplying said input voltages by given constants, second multiplier means adapted to receive the products of said first multiplying means, and means for dividing the output voltage of said second multiplier means by said given constants, said dividing means including amplifier means, and an associated control means which selectively varies the gain of said amplifier means in accordance with the magnitudes of said input voltages.

3. An electron computing mechanism comprising a plurality of input terminals adapted to receive input voltages which are representative of numerical quantities, first multiplier means for multiplying said input voltages by given constants, second multiplier means adapted to receive the products of said first multiplying means, and means for dividing the output voltage of said second multiplier means by said given constants, said dividing means including voltage dividing networks and associated control means which selectively vary said voltage dividing networks in accordance with the magnitudes of said input voltages.

4. An electronic computing mechanism comprising a plurality of input terminals adapted to receive input voltages which are representative of numerical quantities, first multiplier means for multiplying said input voltage by given constants, second multiplier means adapted to receive the products of said first multiplying means, means for dividing the output voltage of said second multiplier means by said given constants, said dividing means including amplifier means and an associated control means which selectively varies the gain of said amplifier means in accordance with magnitudes of said input voltages and additional dividing means receiving the output of said amplifier means, said additional dividing means also being responsive to the magnitudes of said input voltages.

5. An electronic computing mechanism comprising a pair of input terminals adapted to receive input voltages which are representative of numerical quantities, first multiplier means for multiplying said input voltages by first and second constants, respectively, second multiplier means adapted to receive the products of said first multiplier means, means for dividing the output voltage of said second multiplier means by said first constant, means for dividing the resultant voltage by said second constant, and means to automatically select said constants in accordance with the magnitudes of said input voltages.

6. An electronic computing mechanism comprising first multiplying means adapted to receive input voltages representative of numerical quantities, said first means multiplying said input voltages by a constant, a second multiplying means adapted for receiving the output voltage of said first multiplying means, means for dividing the output voltage of said second multiplying means by said constant, and means to automatically select said constant in accordance with the magnitudes of said input voltages.

7. An electronic computing mechanism comprising first multiplying means adapted to receive input voltages representative of numerical quantities, said first means multiplying said input voltages by a constant, a second multiplying means adapted for receiving the output voltage of said first multiplying means, means for dividing the output voltage of said second multiplying means by said constant, means to automatically select said constant in accordance with the magnitudes of said input voltages, and means to perform said selection simultaneously with said first multiplication and said division operations.

References Cited in the file of this patent

UNITED STATES PATENTS

| | | |
|---|---|---|
| 2,053,156 | Livingston | Sept. 1, 1936 |
| 2,302,798 | Percival | Nov. 24, 1942 |
| 2,661,152 | Elias | Dec. 1, 1953 |
| 2,682,000 | Clayton et al. | June 22, 1954 |
| 2,840,307 | Campbell | June 24, 1958 |

FOREIGN PATENTS

| | | |
|---|---|---|
| 406,360 | Great Britain | Feb. 26, 1934 |

OTHER REFERENCES

Electronic Analog Computers (Korn and Korn), 1952, page 11.